United States Patent
Lee

(10) Patent No.: US 9,375,992 B2
(45) Date of Patent: Jun. 28, 2016

(54) TORSION BEAM AXLE DEVICE FOR VEHICLE

(71) Applicant: HYUNDAI MOBIS CO., LTD., Seoul (KR)

(72) Inventor: Kye Ho Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/593,803

(22) Filed: Jan. 9, 2015

(65) Prior Publication Data

US 2015/0258872 A1    Sep. 17, 2015

(30) Foreign Application Priority Data

Mar. 12, 2014  (KR) .......................... 10-2014-0029057

(51) Int. Cl.
*B60G 21/055*  (2006.01)
*B60G 21/05*   (2006.01)

(52) U.S. Cl.
CPC ............ *B60G 21/051* (2013.01); *B60G 21/052* (2013.01); *B60G 2206/20* (2013.01); *B60G 2206/201* (2013.01)

(58) Field of Classification Search
CPC .... B60G 21/052; B60G 21/0551; B60G 7/02; B60G 2200/132
USPC .................................................... 280/124.13
See application file for complete search history.

(56) References Cited

U.S. PATENT DOCUMENTS

| | | | | |
|---|---|---|---|---|
| 4,637,628 A * | 1/1987 | Perkins | .................. | B60G 9/003 267/273 |
| 5,409,254 A * | 4/1995 | Minor | ..................... | B60G 9/003 267/190 |
| 6,086,162 A * | 7/2000 | Pinch | ..................... | B60G 3/145 228/185 |
| 6,267,397 B1 * | 7/2001 | Hamada | ................... | B60G 9/02 280/124.128 |
| 8,684,381 B2 * | 4/2014 | Buhl | .................. | B60G 17/0277 280/124.106 |
| 2007/0145657 A1 * | 6/2007 | Funano | ................ | B60G 21/052 267/293 |
| 2011/0254242 A1 * | 10/2011 | Eismann | .............. | B60G 21/052 280/124.106 |
| 2015/0191070 A1 * | 7/2015 | Raymond | ................ | B60G 3/14 280/124.128 |

FOREIGN PATENT DOCUMENTS

KR    10-2003-0018562 A    3/2003
WO    WO 2013088062 A1 *  6/2013    ........... B60G 21/055

* cited by examiner

*Primary Examiner* — James English
(74) *Attorney, Agent, or Firm* — Knobbe Martens Olson & Bear LLP

(57) ABSTRACT

A torsion beam axle device for a vehicle may include: a pair of trailing arm members having wheels coupled thereto and rotatably coupled to a vehicle body; and a torsion beam member having both ends coupled to the trailing arm member, and bent in a shape protruding toward a rear side of the vehicle body.

12 Claims, 4 Drawing Sheets

TORSION BEAM AXLE DEVICE FOR VEHICLE

CROSS-REFERENCES TO RELATED APPLICATIONS

The present application claims priority to Korean application number 10-2014-0029057, filed on Mar. 12, 2014, which is incorporated by reference in its entirety.

BACKGROUND

The present disclosure relates to a torsion beam axle device for a vehicle, and more particularly, to a torsion beam axle device for a vehicle, which is capable of securing a space between wheels so as to secure a load space or mounting space for surrounding parts, and improving lateral stiffness.

Typically, a CTBA (Coupled Torsion Beam Axle) is a kind of torsion beam axle, and referred to as a twisted beam suspension or coupled link.

The related art of the present invention is disclosed in Korean Patent Laid-open Publication No. 10-2003-0018562 published on Dec. 20, 2011, and entitled "Bush device of coupled torsion beam axle".

SUMMARY

Embodiments of the present invention are directed to a torsion beam axle device for a vehicle, which is capable of securing a load space and mounting space for surrounding parts in a vehicle body by changing the shape of a torsion beam member, and reinforcing lateral stiffness.

In one embodiment, a torsion beam axle device for a vehicle may include: a pair of trailing arm members having wheels coupled thereto and rotatably coupled to a vehicle body; and a torsion beam member having both ends coupled to the trailing arm member, and bent in a shape protruding toward a rear side of the vehicle body.

Each of the trailing arm members may include: a spring support part on which a lower end of a vehicle body spring is received; a wheel coupling part coupled to the spring support part, and having the wheel coupled thereto; and a trailing arm part having one end coupled to the wheel coupling part and the other end rotatably coupled to the vehicle body.

The spring support part may include: a spring-support top part on which the vehicle body spring is received; a spring-support side part coupled to the spring-support top part, and protruding from the bottom of the spring-support top part; and a torsion beam coupling hole formed in a shape passing through the spring-support side part such that the torsion beam member is inserted into the torsion beam coupling hole.

The spring-support side part may include a pair of spring-support side parts coupled to both ends of the spring-support top part, and positioned to face each other.

The spring-support top part and the spring-support side parts may be formed by bending a steel plate.

The wheel coupling part may include: a bracket fixation part coupling the trailing arm part to the spring support part; and a spindle bracket interposed between the bracket fixation part and the wheel.

The bracket fixation part may include: a bracket-fixation side part to which the spindle bracket is coupled; a bracket-fixation front part having both ends coupled to one end of the bracket-fixation side part and the trailing arm part, and formed in a shape covering the front of the spring support part; and a bracket-fixation rear part coupled to the other end of the bracket-fixation side part and formed in a shape covering the rear of the spring support part.

The bracket-fixation side part, the bracket-fixation front part, and the bracket-fixation rear part may be integrally formed.

The wheel coupling part and the trailing arm part may be integrally formed.

The torsion beam member may include: a torsion beam coupling part coupled to the spring support part and having one end extended toward the rear side of the spring support part; and a torsion beam part having both ends coupled to the one ends of the torsion beam coupling parts.

The torsion beam coupling part and the torsion beam part may be integrally formed.

The torsion beam member may be formed by bending a steel pipe.

The torsion beam member may be formed in a U-shape.

The torsion beam coupling part may be positioned under the trailing arm part.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Generally, a CTBA (Coupled Torsion Beam Axle) includes a trailing arm part provided at both sides of a torsion beam part. One end of the trailing arm part is coupled to a mounting bush for mounting the trailing arm part on a vehicle body. The other end of the trailing arm part is coupled to a spring seat part on which a spindle bracket and a vehicle body spring are mounted.

In general, a typical torsion beam part applied to the vehicle is formed in an approximately linear shape, and positioned on a line connecting the centers of wheels or positioned ahead of the line connecting the centers of the wheels. Thus, a load space or mounting space for surrounding parts may be reduced.

The typical torsion beam axle device for a vehicle has low resistance stiffness, that is, low lateral stiffness with respect to a lateral force applied to the wheel. Thus, the steering performance and ride quality may be degraded.

Figure 1:
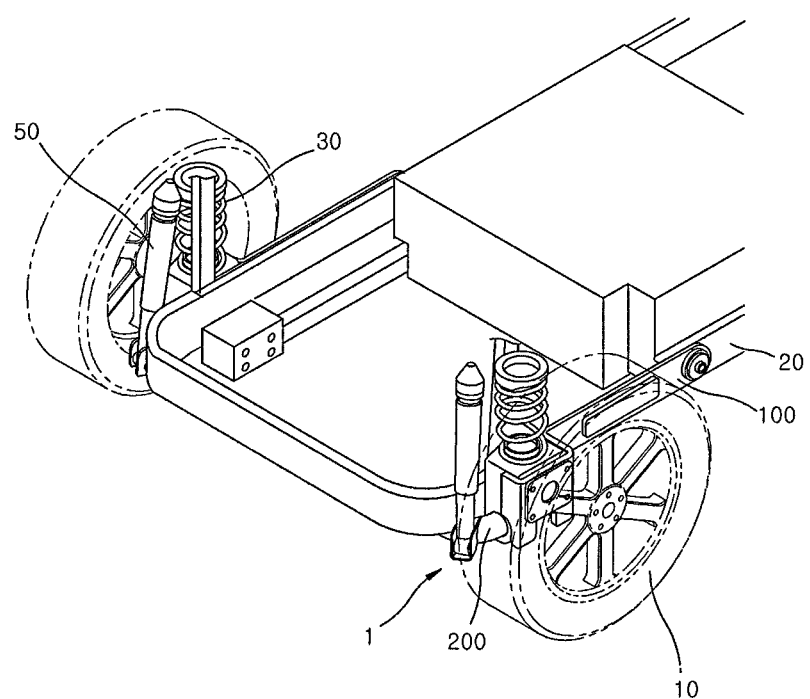
FIG. 1 is a diagram illustrating a state in which a torsion beam axle device for a vehicle in accordance with an embodiment of the present invention is mounted.
Figure 2:
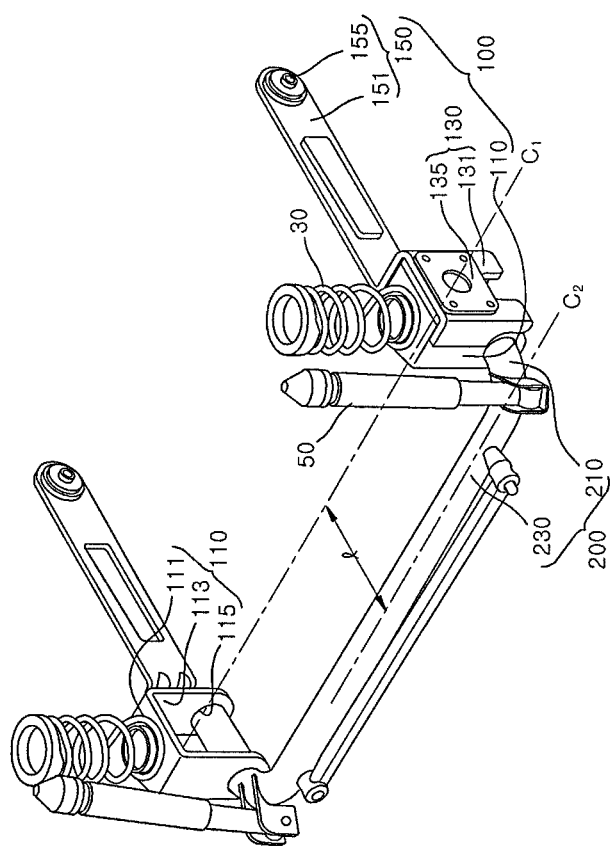
FIG. 2 is a schematic perspective view of the torsion beam axle device for a vehicle in accordance with the embodiment of the present invention.
Figure 3:
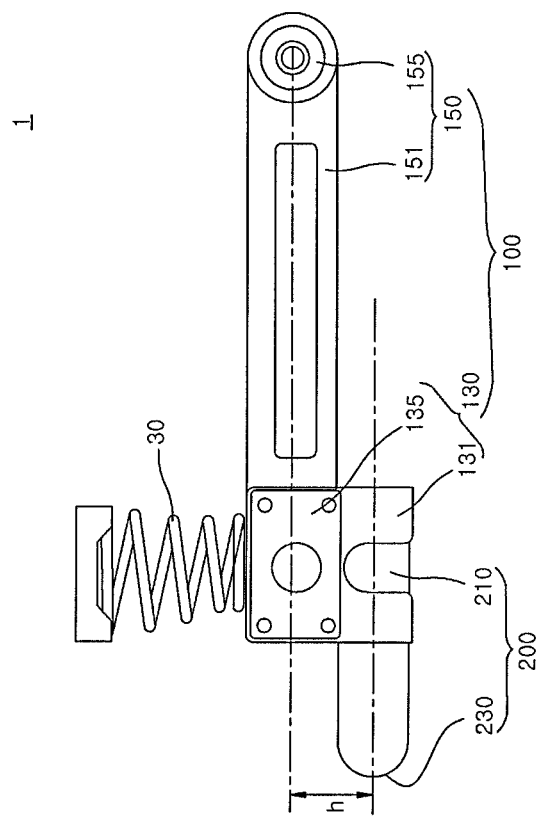
FIG. 3 is a side cross-sectional view of the torsion beam axle device for a vehicle in accordance with the embodiment of the present invention.

FIG. 1 is a diagram illustrating a state in which a torsion beam axle device for a vehicle in accordance with an embodiment of the present invention is mounted. FIG. 2 is a schematic perspective view of the torsion beam axle device for a vehicle in accordance with the embodiment of the present invention. FIG. 3 is a side cross-sectional view of the torsion beam axle device for a vehicle in accordance with the embodiment of the present invention.

Referring to FIGS. 1 to 3, the torsion beam axle device 1 for a vehicle in accordance with the embodiment of the present invention may include a trailing arm member 100 and a torsion beam member 200.

The trailing arm member 100 may be coupled to a wheel 10 and rotatably coupled to a vehicle body 20. In the present embodiment, the trailing arm member 100 may include a spring support part 110, a wheel coupling part 130, and a trailing arm part 150.

The spring support part 110 may have a top surface (based on FIG. 3) on which a vehicle body spring 30 is received, and support the bottom of the vehicle body spring 30. In the present embodiment, the vehicle body spring 30 may include a coil spring of which the upper and lower ends are elastically compressed against the vehicle body 20 and the spring support part 110, respectively. The vehicle body spring 30 may be contracted or compressed through a relative motion between the vehicle body 20 and the spring support part 110.

In the present embodiment, the spring support part 110 may include a spring-support top part 111, a spring-support side part 113, and a torsion beam coupling hole 115.

The spring support top part 111 may be formed in a plate shape and include a metallic material, and the vehicle body spring 30 may be received on the top surface of the spring-support top part 111. The spring-support side part 113 may be extended downward from the front and rear ends of the spring-support top part 111 (based on FIG. 3), and the spring-support top part 111 and the pair of spring-support side parts 113 may form a U-shape which is opened downward. The torsion beam coupling hole 115 may be formed through the spring-support side part 113, and the torsion beam member 200 may be inserted and fixed to the torsion beam coupling hole 115.

In the present embodiment, the spring-support top part 111 and the spring-support side parts 113 may be formed by bending one steel plate.

The wheel coupling part 130 may be formed to in a shape surrounding the spring support part 110, and coupled to the spring support part 110 through welding or bolting. The wheel 10 may be rotatably coupled to the outside of the wheel coupling part 130. In the present embodiment, the wheel coupling part 130 may include a bracket fixation part 131 and a spindle bracket 135.

The bracket fixation part 131 may couple the trailing arm part 150 to the spring support part 110, and the spindle bracket 135 may be coupled to the bracket fixation part 131. In the present embodiment, the bracket fixation part 131 may include a bracket-fixation side part 132, a bracket-fixation front part 133, and a bracket-fixation rear part 134.

Figure 4:
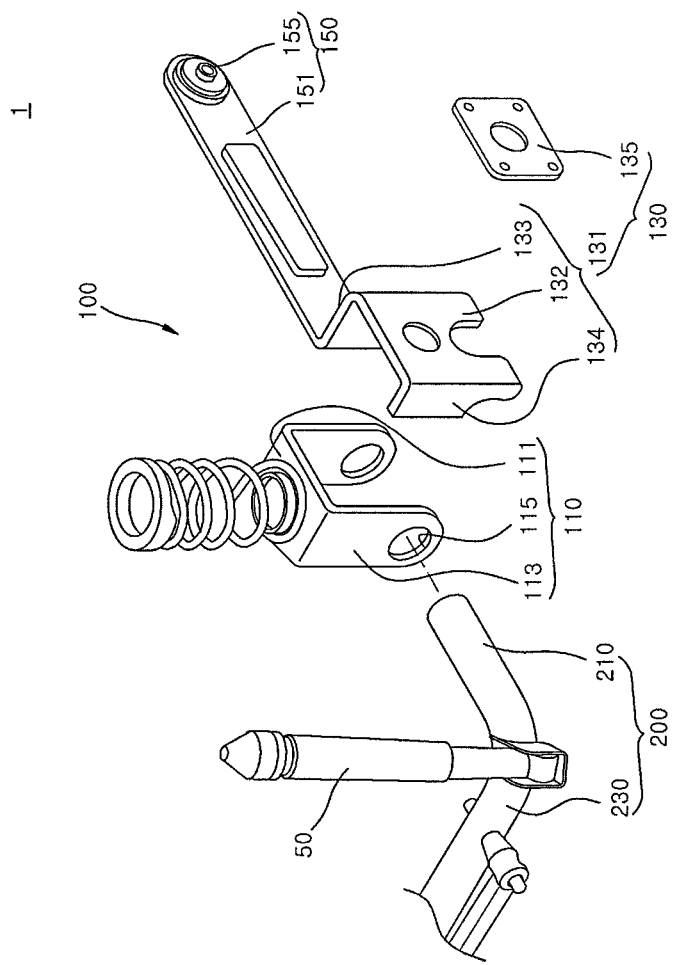
FIG. 4 is an exploded view of the torsion beam axle device for a vehicle in accordance with the embodiment of the present invention.

FIG. 4 is an exploded view of the torsion beam axle device for a vehicle in accordance with the embodiment of the present invention.

Referring to FIGS. 2 to 4, the bracket-fixation side part 132 may be formed in a plate shape and include a metallic material, and the spindle bracket 135 may be coupled to the bracket-fixation side part 132 through welding or bolting.

The bracket-fixation front part 133 may have both ends coupled to the bracket-fixation side part 132 and the trailing arm part 150 so as to connect the bracket-fixation side part 132 and the trailing arm part 150. The bracket-fixation front part 133 may be formed in a shape covering the front of the spring support part 110 (based on FIG. 3).

The bracket-fixation rear part 134 may be formed in a shape covering the rear of the spring support part 110 (left side of FIG. 3) at the bracket-fixation side part 132. In the present embodiment, the bracket-fixation side part 132, the bracket-fixation front part 133, and the bracket-fixation rear part 134 may be integrally formed.

The spindle bracket 135, to which the wheel 10 is rotatably coupled, may be coupled to the bracket-fixation side part 132 through welding or bolding. Since the structure of the spindle bracket 135 and the coupling method for the wheel 10 are apparent to those skilled in the art, the detailed descriptions thereof are omitted herein.

The trailing arm part 150 may have one end coupled to the wheel coupling part 130 and the other end rotatably coupled to the vehicle body 20. The one end of the trailing arm part 150 may correspond to the left end in FIG. 3, and the other end of the trailing arm part 150 may correspond to the right end in FIG. 3. In the present embodiment, the trailing arm part 150 may include the trailing arm 151 and the mounting bush 155.

The trailing arm 151 may form the exterior of the trailing arm part 150. One end of the trailing arm 151 may be coupled to the wheel coupling part 130 or integrated with the wheel coupling part 130, and the other end of the trailing arm 151, to which the mounting bush is inserted and coupled, may be rotatably coupled to the vehicle body 20. In the present embodiment, the wheel coupling part 130 may be integrated with the trailing arm part 150. Since the structure and operation principle of the mounting bush 155 are apparent to those skilled in the art, the detailed descriptions thereof are omitted herein.

Both ends of the torsion beam member 200 may be coupled to the respective trailing arm members 100, and bent in a shape protruding toward the rear of the vehicle body 20. Since the torsion beam member 200 is bent in a shape protruding toward the rear of the vehicle body, an approximate center line $C_2$ of the torsion beam part 230 corresponding to the protruding part of the torsion beam member 200 may be positioned at a distance I from a line $C_1$ connecting the approximate centers of the wheels 10.

Since the approximate center line $C_2$ of the torsion beam part 230 is positioned at the distance I backward from the line $C_1$ connecting the approximate centers of the wheels 10, a space may be secured between the wheels 10. Thus, a load space or mounting space for surrounding parts may be secured. In the present embodiment, the torsion beam member 200 may include the torsion beam coupling part 210 and the torsion beam part 230.

The torsion beam coupling part 210 may be coupled to the spring support part 110, and have one end extended to the rear side of the spring support part 110 (based on FIG. 3). In the present embodiment, the torsion beam coupling part 210 may be welded and coupled to the torsion beam coupling hole 115 in a state where the torsion beam coupling part 210 is inserted into the torsion beam coupling hole 115.

Both ends of the torsion beam part 230 may be coupled to the torsion beam coupling part 210, and the torsion beam part 230 may be formed in an elongated shape in the widthwise direction of the vehicle. In the present embodiment, both ends of the torsion beam part 230 may be coupled to the rear ends of the pair of torsion beam coupling parts 210, and the approximate center line $C_2$ of the torsion beam part 230 may be positioned behind the line $C_1$ connecting the centers of the wheels 10.

In the present embodiment, the torsion beam coupling part 210 and the torsion beam part 230 may be formed of a metallic material, and integrally formed by bending a steel pipe. The torsion beam part 230 may be coupled to a shock absorber 50 through bolting or welding. Since the structure and operation principle of the shock absorber 50 are apparent to those skilled in the art, the detailed descriptions thereof are omitted herein.

In the present embodiment, the torsion beam member 200 may be formed in an approximate U-shape in which the torsion beam part 230 is coupled to both ends of the torsion beam coupling part 210.

In the present embodiment, the torsion beam coupling part 210 may be positioned under the trailing arm part 150 (based on FIG. 3). In order to position the torsion beam coupling part 210 under the trailing arm part 150, the torsion beam coupling hole 115 to which the torsion beam coupling part 210 is coupled may be positioned at the bottom of the spring-support side part 113.

When the torsion beam coupling part 210 is positioned under the trailing arm part 150, the torsion beam member 200 may support the wheel 10 at a different level from the trailing arm part 150 in case where a lateral force is applied to the wheel 10 while the vehicle turns the direction. Thus, lateral stiffness for the wheel 10 may be increased more than when the wheel 10 is supported at a single position.

The mounting method and operation principle of the torsion beam axle device 1 for a vehicle in accordance with the embodiment of the present invention will be described below.

The spring support part 110 may be coupled to the trailing arm part 150. Specifically, the pair of spring-support side parts 113 may be positioned to be contacted with the inside of the wheel coupling part 130, that is, the insides of the bracket-fixation front part 133 and the bracket-fixation rear part 134, in a state where the spring-support top part 111 faces the upward direction. Then, the pair of spring-support side parts 113 may be coupled to the bracket-fixation front part 133 and the bracket-fixation rear part 134 through welding or bolting.

When the spring support part 110 is coupled to the trailing arm part 150, the torsion beam member 200 may be coupled to the spring support part 110. That is, the torsion beam coupling part 210 may be moved to the front of the vehicle (right side of FIG. 3), inserted into the torsion beam coupling hole 115 formed at the bottom of the spring support part 110, and fixed through welding.

Through the coupling, the approximate center line $C_2$ of the torsion beam part 230 may be positioned at the rear side of the vehicle (left side of FIG. 3) from the line $C_1$ connecting the centers of the wheels 10. Since the center line $C_2$ of the torsion beam part 230 is positioned behind the line $C_1$ connecting the centers of the wheels 10, a space may be secured between the wheels 10. Thus, a mounting space for surrounding parts may be secured.

In the present embodiment, the approximate center line of the torsion beam coupling part 210 may be set at a level lower by a predetermined height h than the level of the approximate center line of the trailing arm part 150. Specifically, the level at which the torsion beam coupling part 210 is coupled to the spring support part 110 may be set to be lower than the level at which the trailing arm 151 is coupled to the spring support part 110.

In the torsion beam axle device 1 for a vehicle in accordance with the embodiment of the present invention, when a lateral force is applied to the wheel 10, the torsion beam member 200 may support the wheels 10 at a level lower by a predetermined height h than the level of the approximate center of the wheel 10, while the trailing arm 151 supports the wheel 10 at the level of the approximate center of the wheel. Thus, lateral stiffness may be reinforced to improve the steering performance and ride quality of the vehicle.

In accordance with the embodiments of the present invention, since the torsion beam member is bent in a shape protruding toward the rear side of the vehicle, a space may be secured between the wheels. Thus, a load space or mounting space for surrounding parts may be increased.

Furthermore, since the torsion beam member is positioned under the trailing arm part, a lateral force applied to the wheel may be supported at a plurality of positions. Thus, lateral stiffness may be improved.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A torsion beam suspension system for a vehicle, comprising:
    a first trailing arm hingedly coupled to a vehicle body;
    a second trailing arm hingedly coupled to the vehicle body and apart from the first trailing arm in a lateral direction of the vehicle; and
    a torsion beam being a bent steel pipe having a middle portion extending in the lateral direction and interposed between a first bent portion and a second bent portion that are bent from the middle portion, wherein the first bent portion is mechanically connected to the first trailing arm, and the second bent portion is mechanically connected to the second trailing arm,
    wherein the first and second bent portions extend generally in a longitudinal direction of the vehicle such that the extension of the first and second bent portions make the middle portion stay away in the longitudinal direction from where the first bent portion is connected to the first trailing arm and from where the second bent portion is connected to the second trailing arm.

2. The torsion beam suspension system of claim 1, wherein each of the first and second trailing arms comprises:
    a spring support part on which a lower end of a vehicle body spring is received;
    a wheel coupling part coupled to the spring support part, and having a wheel coupled thereto; and
    a trailing arm part having one end coupled to the wheel coupling part and the other end rotatably coupled to the vehicle body.

3. The torsion beam suspension system of claim 2, wherein the wheel coupling part comprises:
    a bracket fixation part coupling the trailing arm part to and the spring support part; and
    a spindle bracket interposed between the bracket fixation part and the wheel.

4. The torsion beam suspension system of claim 2, wherein the wheel coupling part and the trailing arm part are integrally formed.

5. The torsion beam suspension system of claim 1, wherein the first trailing arm comprises a wheel coupler portion to which a wheel is coupled such that the wheel is rotatable about a wheel axis.

6. The torsion beam suspension system of claim 5, wherein the first bent portion is coupled to the trailing arm such that the first bent portion is disposed under the wheel axis when viewed in a viewing direction along the wheel axis.

7. The torsion beam suspension system of claim 5, further comprising a coupler fixed to and coupling the first trailing arm and the first bent portion, wherein the first bent portion is fixed to the coupler at a position under the wheel axis when viewed in a viewing direction along the wheel axis.

8. A torsion beam suspension system comprising:
a pair of trailing arm members having wheels coupled thereto and rotatably coupled to a vehicle body; and
a torsion beam member having both ends coupled to the trailing arm member, and bent in a shape protruding toward a rear side of the vehicle body,
wherein each of the trailing arm members comprises:
   a spring support part on which a lower end of a vehicle body spring is received;
   a wheel coupling part coupled to the spring support part, and having the wheel coupled thereto; and
   a trailing arm part having one end coupled to the wheel coupling part and the other end rotatably coupled to the vehicle body,
wherein the spring support part comprises:
   a spring-support top part on which the vehicle body spring is received;
   a spring-support side part coupled to the spring-support top part, and protruding from the bottom of the spring-support top part; and
   a torsion beam coupling hole formed in a shape passing through the spring-support side part such that the torsion beam member is inserted into the torsion beam coupling hole.

9. The torsion beam suspension system of claim 8, wherein the spring-support side part comprises a pair of spring-support side parts coupled to both ends of the spring-support top part, and positioned to face each other.

10. The torsion beam suspension system of claim 9, wherein the spring-support top part and the spring-support side parts are formed by bending a steel plate.

11. A torsion beam suspension system comprising:
a pair of trailing arm members having wheels coupled thereto and rotatably coupled to a vehicle body; and
a torsion beam member having both ends coupled to the trailing arm member, and bent in a shape protruding toward a rear side of the vehicle body,
wherein each of the trailing arm members comprises:
   a spring support part on which a lower end of a vehicle body spring is received,
   a wheel coupling part coupled to the spring support part, and having the wheel coupled thereto, and
   a trailing arm part having one end coupled to the wheel coupling part and the other end rotatably coupled to the vehicle body,
wherein the wheel coupling part comprises:
   a bracket fixation part coupling the trailing arm part to the spring sport part, and
   a spindle bracket interposed between the bracket fixation part and the wheel,
wherein the bracket fixation part comprises:
   a bracket-fixation side part to which the spindle bracket is coupled;
   a bracket-fixation front part having both ends coupled to one end of the bracket-fixation side part and the trailing arm part, and formed in a shape covering the front of the spring support part; and
a bracket-fixation rear part coupled to the other end of the bracket-fixation side part and formed in a shape covering the rear of the spring support part.

12. The torsion beam suspension system of claim 11, wherein the bracket-fixation side part, the bracket-fixation front part, and the bracket-fixation rear part are integrally formed.

\* \* \* \* \*